US007921136B1

(12) United States Patent
Shuman et al.

(10) Patent No.: US 7,921,136 B1
(45) Date of Patent: Apr. 5, 2011

(54) METHOD AND SYSTEM FOR USING GEOGRAPHIC DATA FOR DEVELOPING SCENES FOR ENTERTAINMENT FEATURES

(75) Inventors: Michael V. Shuman, Chicago, IL (US); Kurt Brooks Uhlir, Chicago, IL (US); Christopher Dougherty, Highland Park, IL (US)

(73) Assignee: Navteq North America, LLC, Chicago, IL (US)

( * ) Notice: Subject to any disclaimer, the term of this patent is extended or adjusted under 35 U.S.C. 154(b) by 983 days.

(21) Appl. No.: 10/941,802

(22) Filed: Sep. 15, 2004

Related U.S. Application Data

(63) Continuation-in-part of application No. 10/798,459, filed on Mar. 11, 2004, and a continuation-in-part of application No. 10/798,531, filed on Mar. 11, 2004, and a continuation-in-part of application No. 10/798,632, filed on Mar. 11, 2004, and a continuation-in-part of application No. 10/798,703, filed on Mar. 11, 2004.

(51) Int. Cl.
*G06F 17/30* (2006.01)
*G06F 17/00* (2006.01)
(52) U.S. Cl. .................... 707/802; 715/201; 715/209
(58) Field of Classification Search .......... 707/104.1, 707/102, 802, 803, 999; 715/201, 202, 209
See application file for complete search history.

(56) References Cited

U.S. PATENT DOCUMENTS

| 2,026,082 A | | 12/1935 | Darrow ........................ 273/134 |
| 4,580,165 A | * | 4/1986 | Patton et al. ................. 348/510 |
| 4,645,459 A | * | 2/1987 | Graf et al. ..................... 434/43 |
| 4,827,344 A | * | 5/1989 | Astle et al. ................... 348/597 |
| 4,970,666 A | * | 11/1990 | Welsh et al. ................. 345/423 |
| 5,226,160 A | * | 7/1993 | Waldron et al. ............. 719/324 |
| 5,327,156 A | * | 7/1994 | Masukane et al. ........... 345/634 |

(Continued)

FOREIGN PATENT DOCUMENTS
WO  WO 02/26518 A1  4/2002
(Continued)

OTHER PUBLICATIONS

Koller, D.; Lindstrom, P.; Ribarsky, W.; Hodges, L.F.; Faust, N.; Turner, G., "Virtual GIS: a real-time 3D geographic information system," Visualization, 1995. Visualization '95. Proceedings., IEEE Conference on , vol., No., pp. 94-100, 443, Oct. 29-Nov. 3, 1995.*

(Continued)

*Primary Examiner* — Robert Stevens
(74) *Attorney, Agent, or Firm* — Adil M. Musabji; Frank J. Kozak; Jon D. Shutter

(57) ABSTRACT

A system and method are disclosed for facilitating development of scenes for entertainment features, such as motion pictures or television shows, that depict or represent actual, real world (or imaginary) geographic areas. A source database contains data that represent geographic features in a region including roads in the region. The data in the source database includes attributes suitable for use for providing navigation-related functions. In addition to providing data from the source database for navigation-related functions, data from the source database are also provided for facilitating development of scenes for entertainment features that depict or represent actual, real world (or imaginary) geographic areas. An application programming interface, as well as other tools for handling geographic data, is provided for accessing and processing of the geographic data.

17 Claims, 9 Drawing Sheets

U.S. PATENT DOCUMENTS

| | | | | |
|---|---|---|---|---|
| 5,432,900 | A * | 7/1995 | Rhodes et al. | 715/202 |
| 5,459,529 | A * | 10/1995 | Searby et al. | 348/586 |
| 5,519,809 | A * | 5/1996 | Husseiny et al. | 704/275 |
| 5,526,479 | A | 6/1996 | Barstow et al. | 395/152 |
| 5,573,402 | A | 11/1996 | Gray | 434/69 |
| 5,616,079 | A | 4/1997 | Iwase et al. | 463/32 |
| 5,737,533 | A * | 4/1998 | de Hond | 709/219 |
| 5,795,228 | A * | 8/1998 | Trumbull et al. | 463/42 |
| 5,848,373 | A * | 12/1998 | DeLorme et al. | 701/200 |
| 5,861,881 | A * | 1/1999 | Freeman et al. | 715/201 |
| 5,930,501 | A * | 7/1999 | Neil | 713/400 |
| 5,945,985 | A * | 8/1999 | Babin et al. | 715/209 |
| 5,953,076 | A * | 9/1999 | Astle et al. | 348/584 |
| 5,987,156 | A * | 11/1999 | Ackland et al. | 382/125 |
| 6,023,278 | A * | 2/2000 | Margolin | 345/419 |
| 6,146,143 | A * | 11/2000 | Huston et al. | 434/69 |
| 6,154,689 | A * | 11/2000 | Pereira et al. | 701/1 |
| 6,183,364 | B1 | 2/2001 | Trovato | 463/32 |
| 6,192,314 | B1 * | 2/2001 | Khavakh et al. | 701/209 |
| 6,219,837 | B1 * | 4/2001 | Yeo et al. | 725/38 |
| 6,240,555 | B1 * | 5/2001 | Shoff et al. | 725/110 |
| 6,298,303 | B1 * | 10/2001 | Khavakh et al. | 701/209 |
| 6,401,033 | B1 | 6/2002 | Paulauskas et al. | 701/207 |
| 6,433,784 | B1 * | 8/2002 | Merrick et al. | 345/473 |
| 6,446,261 | B1 * | 9/2002 | Rosser | 725/34 |
| 6,487,497 | B2 * | 11/2002 | Khavakh et al. | 701/209 |
| 6,509,869 | B2 | 1/2003 | Aoyama | 342/357.13 |
| 6,604,242 | B1 * | 8/2003 | Weinstein et al. | 725/109 |
| 6,612,925 | B1 | 9/2003 | Forsberg | 463/6 |
| 6,677,858 | B1 | 1/2004 | Faris et al. | 340/573.1 |
| 6,678,611 | B2 * | 1/2004 | Khavakh et al. | 701/210 |
| 6,822,624 | B2 * | 11/2004 | Naimer et al. | 345/9 |
| 6,932,698 | B2 * | 8/2005 | Sprogis | 463/9 |
| 6,956,573 | B1 * | 10/2005 | Bergen et al. | 345/473 |
| 7,043,357 | B1 * | 5/2006 | Stankoulov et al. | 701/200 |
| 7,054,742 | B2 * | 5/2006 | Khavakh et al. | 701/209 |
| 7,096,117 | B1 * | 8/2006 | Gale et al. | 701/208 |
| 7,613,467 | B2 * | 11/2009 | Fleischman | 455/456.1 |
| 7,743,330 | B1 * | 6/2010 | Hendricks et al. | 715/723 |
| 7,828,655 | B2 * | 11/2010 | Uhlir et al. | 463/30 |
| 2001/0027456 | A1 * | 10/2001 | Lancaster et al. | 707/104.1 |
| 2001/0048484 | A1 * | 12/2001 | Tamir et al. | 348/589 |
| 2002/0063709 | A1 * | 5/2002 | Gilbert et al. | 345/427 |
| 2002/0097244 | A1 * | 7/2002 | Merrick et al. | 345/473 |
| 2002/0112249 | A1 * | 8/2002 | Hendricks et al. | 725/136 |
| 2002/0180973 | A1 * | 12/2002 | MacKinnon et al. | 356/425 |
| 2003/0025726 | A1 * | 2/2003 | Yamamoto | 345/723 |
| 2003/0028319 | A1 * | 2/2003 | Khavakh et al. | 701/209 |
| 2003/0048294 | A1 * | 3/2003 | Arnold | 345/738 |
| 2003/0097664 | A1 * | 5/2003 | Meyers et al. | 725/138 |
| 2003/0195023 | A1 | 10/2003 | Di Cesare | 463/9 |
| 2003/0215430 | A1 * | 11/2003 | Petrus | 424/94.1 |
| 2004/0012717 | A1 * | 1/2004 | Sprague et al. | 348/564 |
| 2004/0039520 | A1 * | 2/2004 | Khavakh et al. | 701/201 |
| 2004/0046712 | A1 * | 3/2004 | Naimer et al. | 345/9 |
| 2004/0117822 | A1 * | 6/2004 | Karaoguz et al. | 725/37 |
| 2004/0205498 | A1 * | 10/2004 | Miller | 715/501.1 |
| 2004/0225635 | A1 * | 11/2004 | Toyama et al. | 707/1 |
| 2005/0001852 | A1 * | 1/2005 | Dengler et al. | 345/632 |
| 2005/0202877 | A1 * | 9/2005 | Uhlir et al. | 463/43 |
| 2008/0021953 | A1 * | 1/2008 | Gil | 709/203 |
| 2008/0119274 | A1 * | 5/2008 | Eck et al. | 463/40 |

FOREIGN PATENT DOCUMENTS

WO      WO 02/39363 A1     5/2002

OTHER PUBLICATIONS

Yoav I. H. Parish; Pascal Müller, "Procedural Modeling of Cities", Proceedings of the 28th annual conference on Computer graphics and interactive techniques, ACM New York, NY, USA, 2001, pp. 301-308.*

Hwang, Tae-Hyun, et al., "MPEG-7 Metadata for Video-Based GIS Applications", IGARSS 2003, vol. 6, Jul. 2003, pp. 3641-3643.*

Wang, Yonghong, et al., "Study on the Interconnection and Interoperability Between Urban 3D Visualization and Geographic Information System", IGARSS 2002, vol. 6, Jun. 2002, pp. 3535-3537.*

Acevedo, William, et al., "Time-Series Animation Techniques for Visualizing Urban Growth", Computers & Geosciences, vol. 23, Issue 4, May 1997, pp. 423-435.*

Christel, Michael G., et al., "Interactive Maps for a Digital Video Library", IEEE MultiMedia, vol. 7, No. 1, Jan.-Mar. 2000, pp. 60-67.*

Claramunt, C., et al., "A New Framework for the Integration, Analysis and Visualisation of Urban Traffic Data within Geographic Information Systems", Transportation Research Part C: Emerging Technologies, vol. 8, Issues 1-6, Feb.-Dec. 2000, pp. 167-184.*

Montoya, Lorena, "Geo-Data Acquisition Through Mobile GIS and Digital Video: An Urban Disaster Management Perspective", Environmental Modelling & Software, vol. 18, Issue 10, Dec. 2003, pp. 896-876.*

Rafey, Richter A., et al., "Enabling Custom Enhancements in Digital Sports Broadcasts", WEB3D 2001, Paderborn, Germany, © 2001, pp. 101-107 and 150.*

Hung, Yi-Ping, et al., "Augmenting Panoramas with Object Movies by Generating Novel Views with Disparity-Based View Morphing", The Journal of Visualization and Computer Animation, vol. 13, John Wiley & Sons, © 2002, pp. 237-247.*

Bazzini, Doris G., et al., "The Aging Woman in popular Film: Underrepresented, Unattractive, Unfriendly and Unintelligent", Sex Roles, vol. 36, No. 7/8, Plenum Publishing Corp., © 1997, pp. 531-543.*

Raskar, Ramesh, et al., "Shader Lamps: Animating real Objects with Image-Based Illumination", Technical Report TR00-027, Univ. of North Carolina, Chapel Hill, NC, © 2000, pp. 1-10.*

Hasenfratz, J. M., et al., "Real-Time Capture, Reconstruction and Insertion into Virtual World of Human Actors", Vision, Video and Graphics, The Eurographics Association, © 2003, pp. 1-8.*

Cavazza, Marc, "Virtual Unreality: Storytelling in Virtual Environments", VRST '03, Osaka, Japan, Oct. 1-3, 2003, pp. 1-2.*

Kang, Hyung Woo, et al., "Tour Into the Video: Image-based Navigation Scheme for Video Sequences of Dynamic Scenes", VRST '02, Hong Kong, Nov. 11-13, 2002, pp. 73-80.*

Berger, Marie-Odile, et al., "Mixing synthetic and video images of an outdoor urban environment", Machine Vision and Applications, vol. 11, No. 3, Springer-Verlag, © 1999, pp. 145-159.*

Danahy, John, "Visualization Data Needs in Urban Environmental Planning and Design", Photogrammetric Week '99, Wichmann Verlag, Heidelberg, Germany, © 1999, pp. 351-365.*

Koch, Reinhard, "Automatic Reconstruction of Buildings from Stereoscopic Image Sequences", Computer Graphics Forum, vol. 12, No. 3, Sep. 1993, pp. 339-350.*

Kanade, Takeo, et al., "Virtualized Reality: Constructing Virtual Worlds from Real Scenes", IEEE Multimedia, vol. 4, Issue 1, Jan.-Mar. 1997, pp. 34-47.*

Mackay, Wendy E., et al., "Virtual Video Editing in Interactive Multimedia Applications", Communications of the ACM, vol. 32, No. 7, Jul. 1989, pp. 802-810.*

Klaus, Todd, TerraScene Scenery Generation System, v. 2.0, © 2000, 63 pages.*

Sebe, Ismail Oner, et al., "3D Video Surveillance with Augmented Virtual Environments", IWVS '03, Berkeley, CA, Nov. 7, 2003, pp. 107-112.*

Sombrio, Bob, SIM Copter User's Manual, Maxis, Walnut Creek, CA, © 1996, 74 pages.*

Pac Manhattan, http://pacmanhattan.com/yourcity.php, pp. 1-3, (2004).

Map Quests, WIRED, p. 052 (Feb. 2004).

\* cited by examiner

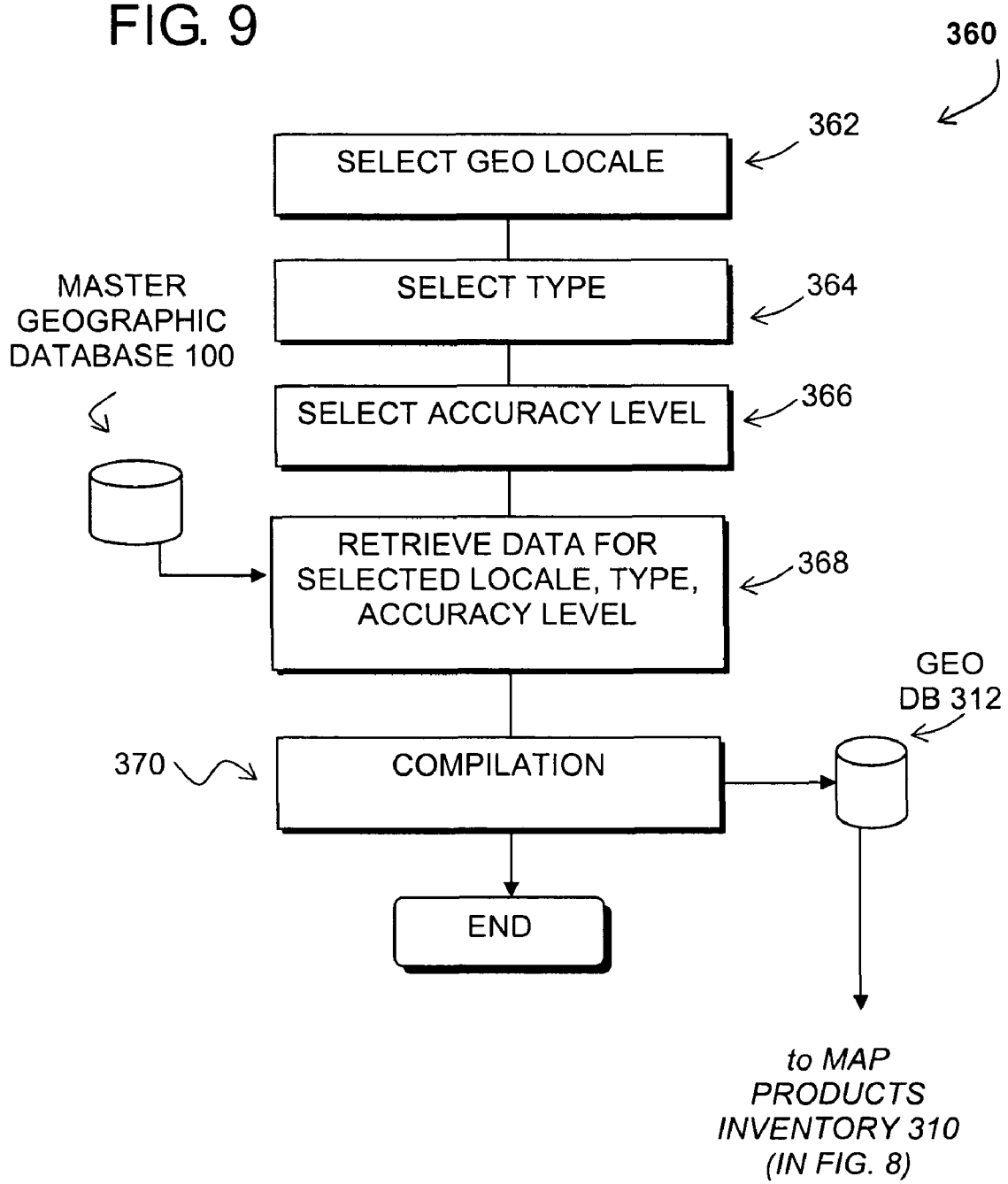

METHOD AND SYSTEM FOR USING GEOGRAHIC DATA FOR DEVELOPING SCENES FOR ENTERTAINMENT FEATURES

REFERENCE TO RELATED APPLICATIONS

This is a continuation-in-part of the copending patent applications entitled "METHOD AND SYSTEM FOR USING GEOGRAHIC DATA IN COMPUTER GAME DEVELOPMENT", file Mar. 11, 2004 Ser. No. 10/798,459, "APPLICATION PROGRAMMING INTERFACE FOR GEOGRAPHIC DATA IN COMPUTER GAMES", Ser. No. 10/798,531, "GEOGRAPHIC AREA TEMPLATES FOR COMPUTER GAMES", Ser. No. 10/798,632, and "COMPUTER GAME DEVELOPMENT FACTORY SYSTEM AND METHOD", Ser. No. 10/798,703, the entire disclosures of which are incorporated by reference herein.

BACKGROUND OF THE INVENTION

The present invention relates to a system and method that facilitate development of entertainment features, such as motion pictures and television shows. More particularly, the present invention relates to a system and method that use geographic data to facilitate development of scenes for entertainment features that depict actual, real world geographic areas or fictional geographic areas, including the road networks in the geographic areas.

Some motion pictures and television shows (i.e., entertainment features) are produced that include scenes created using computer graphics (CG). These motion pictures or television shows may include both CG-created scenes and live action scenes or alternatively, some motion pictures or television shows may be produced entirely of CG-created scenes. In some cases, CG created scenes are used as a background with live actors or props superimposed over the background. In other cases, the images of the actors themselves may be created using CG.

One of the advantages of using CG to create scenes for motion pictures or television shows is the ability to depict things that would be difficult or impossible to show otherwise. Another advantage of using CG to create scenes for motion pictures or television shows is that it may be less expensive than filming the scene live on location. For example, filming on location may require significant expenses for travel for the actors and film crew, obtaining the necessary permits, cordoning off the area, hiring stunt performers, hiring security, catering, and other logistical expenses. In addition, filming on location may be delayed due to weather, traffic or other reasons, resulting in additional expenses.

Although using CG to create scenes for use in motion pictures or television shows has advantages, there are considerations to be addressed. One consideration relates to making the scenes look realistic. Making scenes look realistic may require the collection and processing of large amounts of data. The collection and processing of such large amounts of data may be expensive and time consuming, thereby offsetting the benefits of using CG to create scenes of physical places for use in motion pictures or television shows.

Accordingly, it is an objective to facilitate using CG to make scenes for entertainment features, such as motion pictures or television shows, that depict actual or imaginary physical places.

SUMMARY OF THE INVENTION

To address these and other objectives, the present invention includes a system and method for facilitating development of scenes for entertainment features, such as motion pictures or television shows, that depict actual, real world or imaginary geographic areas. A source database contains data that represent geographic features in a region including roads in the region. The data in the source database includes attributes suitable for use for providing navigation-related functions. In addition to providing data from the source database for navigation-related functions, data from the source database are also provided for facilitating development of scenes for entertainment features that depict actual, real world or imaginary geographic areas. An application programming interface, as well as other tools for handling geographic data, is provided for accessing and processing of the geographic data.

BRIEF DESCRIPTION OF THE DRAWINGS

FIG. 9 is a flowchart showing steps in a process for forming the map data products shown in FIG. 8.

DETAILED DESCRIPTION OF THE PRESENTLY PREFERRED EMBODIMENTS

I. Introduction

The embodiments disclosed herein relate to developing scenes for entertainment features, such as motion pictures or television shows, that are created using computer graphics (CG) and that depict real or imaginary geographic locales. For example, a scene may depict a car chase through the streets of Miami, Fla., an aircraft flight over Texas, and so on. In the embodiments disclosed herein, the CG-created scenes are produced using geographic data and appropriate rendering software. The geographic data is obtained from a map data developer. In these embodiments, the map data developer collects, confirms, updates, processes and distributes geographic data for other, non-entertainment related purposes, such as navigation.

II. Source Geographic Database

Figure 1:
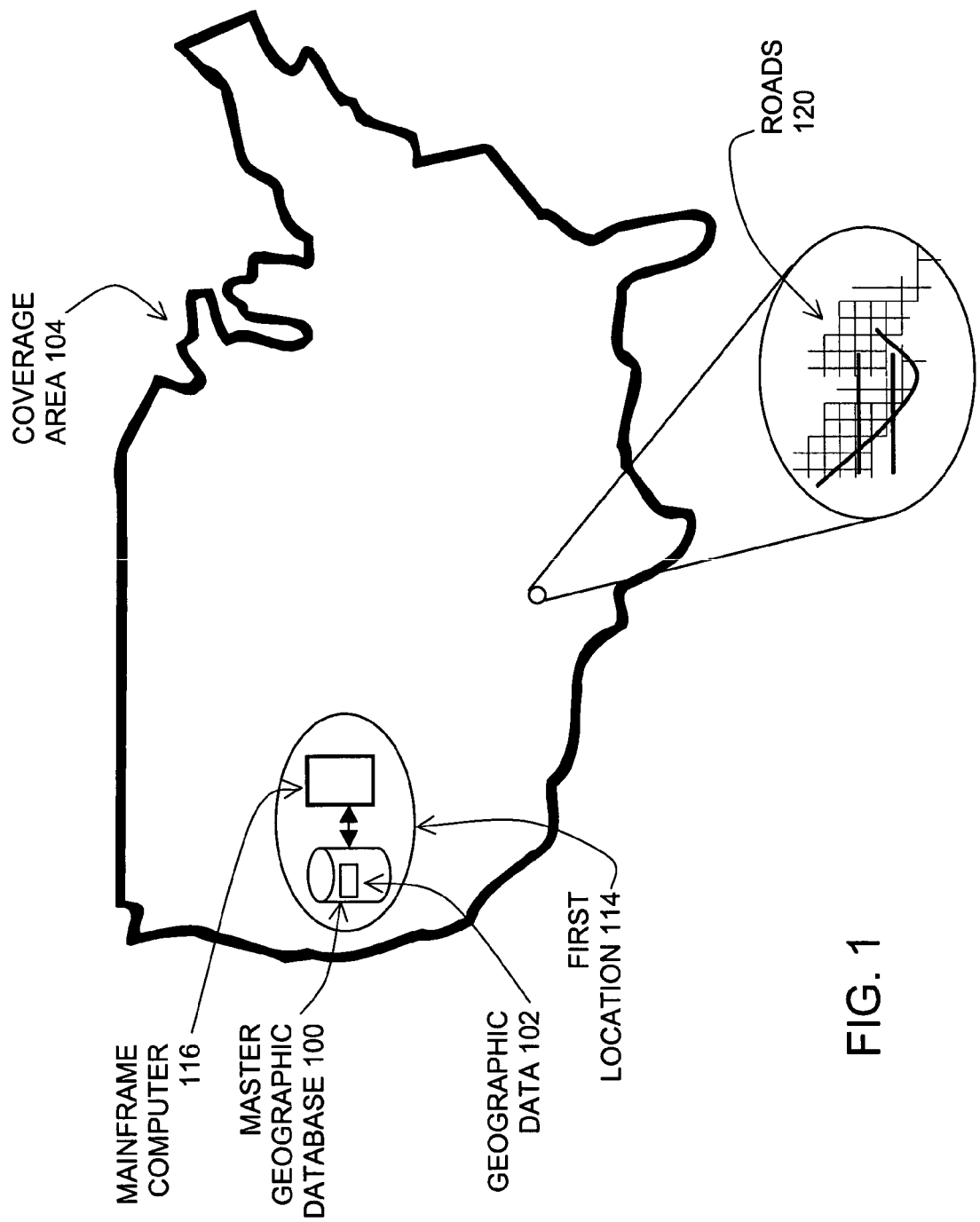
FIG. 1 is a diagram that illustrates a relationship between a master version of a geographic database and a coverage area.
Figure 2:
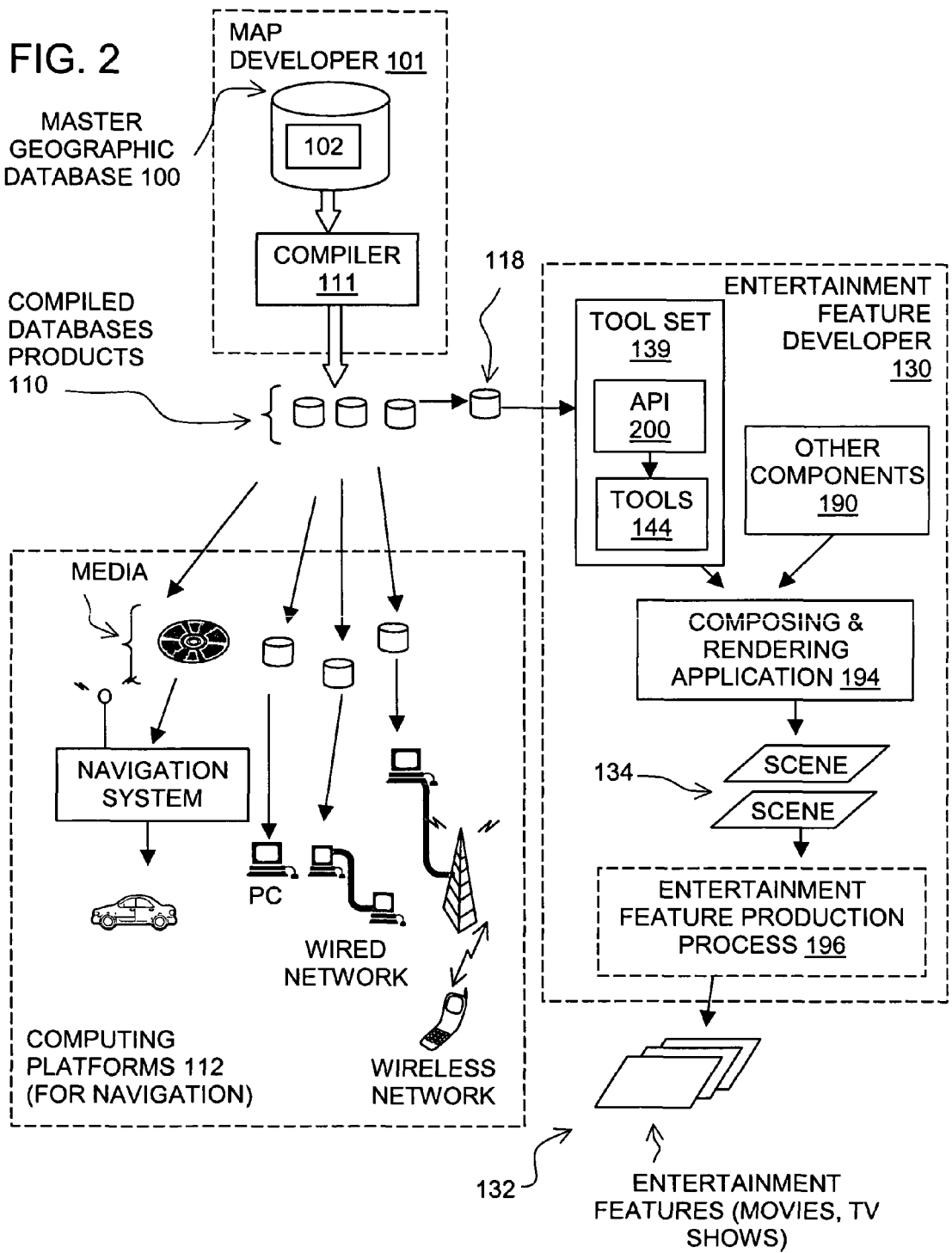
FIG. 2 is a block diagram showing a first embodiment of a system for facilitating use of geographic data in developing scenes for entertainment features, such as motion pictures or television shows.

Referring to FIGS. 1 and 2, a master or source version of a geographic database 100 is owned and developed by a geographic database developer 101 (also referred to as a "map developer", a "map data developer" or the like). (Although only one source database and geographic database developer are shown, the embodiments disclosed herein are not limited to only a single source database or a single geographic database developer.) The master version of the geographic database 100 contains data 102 (also referred to a "geographic data" or "spatial data") that represent geographic features in a coverage area 104. The coverage area 104 may correspond to an entire country, such as the United States. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the U.S. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 120 located in the coverage area 104. The data about the road network 120 include various kinds of information, such as the geographic coordinates of positions of the roads, street names of the roads, address ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities, and other geographic features, such as bodies of water, mountain ranges, etc. The master version of the geographic database 100 may include other kinds of information.

There are different ways used by the geographic database developer to collect data. These ways include obtaining data from other sources, such as municipalities. In addition, the geographic database developer may employ field personnel to travel by vehicle along roads throughout the geographic region to observe features and record information about them. The data collected by the geographic database developer are stored in the master version of the geographic database 100.

The geographic database developer 101 continues to collect data that represent the features in the geographic coverage area 104 on an ongoing basis. One reason that the geographic database developer continues to collect data is that the features in the coverage area 104 change over time. Accordingly, the geographic database developer collects data about the same features in order to update or confirm the previously collected data about the features. Another reason that the geographic database developer continues to collect data is to expand the coverage and/or detail of the master version of the geographic database 100. For example, at one point in time the master version of the geographic database 100 may include data that represents only a portion of the entire coverage area 104. After that point in time, the geographic database developer collects data about features in areas that were not previously represented in order to expand the coverage of the master version of the geographic database 100.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the VSAM format and the GDF format, although other kinds of formats, both proprietary and non-proprietary, may be suitable. In general, the format of the master database 100 is not suitable for use in navigation systems.

A copy of the master version of the geographic database 100 is physically located at a first location 114. In one embodiment, the master version of the geographic database 100 is stored on one or more hard drives, tapes or other media, and accessed with an appropriate computer 116. Any suitable computer may be used, such as a mainframe computer, a plurality of networked microcomputers, etc.

III. API for use of Geographic Data for Entertainment Features

A. First Embodiment

FIG. 2 shows an overview of a first embodiment of a system and method for facilitating the development of entertainment features, such as motion pictures or television shows, that use computer graphics (CG) to depict scenes that include geographic features, such as roads, in actual or imaginary places. In FIG. 2, the master version of the geographic database 100 is used to make compiled database products 110. The compiled database products 110 are made using a compiler 111, which is a software program run on an appropriate computer platform.

The compiled database products 110 may include only portions of all the data in the master version of the geographic database 100. For example, the compiled database products 110 may include data that relate to only one or more specific sub-areas within the coverage area 104 of the master version of the geographic database 100. Further, the compiled database products 110 may include fewer than all the data attributes that describe geographic features represented in the master version of the geographic database 100.

The compiled database products 110 are used on various kinds of computing platforms. For example, the compiled database products 110 are used in computing platforms 112 used for navigation. The computing platforms 112 used for navigation include in-vehicle navigation systems, hand-held portable navigation systems, personal computers (including desktop and notebook computers), and other kinds of devices, such as personal digital assistant (PDA) devices, pagers, telephones, etc. The compiled database products 110 are also used on networked computing platforms and environments, including systems connected to the Internet.

The compiled database products 110 that are used in computing platforms used for navigation are stored on suitable media. For example, the complied database products may be stored on CD-ROM disks, hard drives, DVD disks, flash memory, or other types of media that are available now or that become available in the future.

On the computing platforms 112 used for navigation, the compiled database products 110 are used by various software applications. For example, the compiled database products 110 may be used by software applications that provide navigation-related functions, such as route calculation, route guidance, vehicle positioning, map display, and electronic yellow pages, as well as other kinds of functions.

In addition to producing compiled database products for use on computing platforms used for navigation, the geographic database developer 101 produces one or more compiled database products 118 for use by an entertainment feature producer or developer 130. The compiled database product 118 used by the entertainment feature developer 130 may be the same as or similar to the compiled database products 110 used in the computing platforms 112 used for navigation. The compiled database product 118 used by the entertainment feature developer 130 may be provided on a suitable media, such as one or more CD-ROM disks, DVD disks, or hard drives. Alternatively, the compiled database product 118 used by the entertainment feature developer 130 may be provided over a network connection.

The entertainment feature developer 130 uses some or all the data from the compiled geographic database 118, along with other data and components (as explained below), to create scenes 134 for entertainment features 132, such as motion pictures or television shows. The scenes for entertainment features 132 created using the data from the geographic database 118 visually depict geographic features located in some or all the coverage area of the geographic database 118, and may include some or all the road network represented by the geographic database 118.

Figure 3:
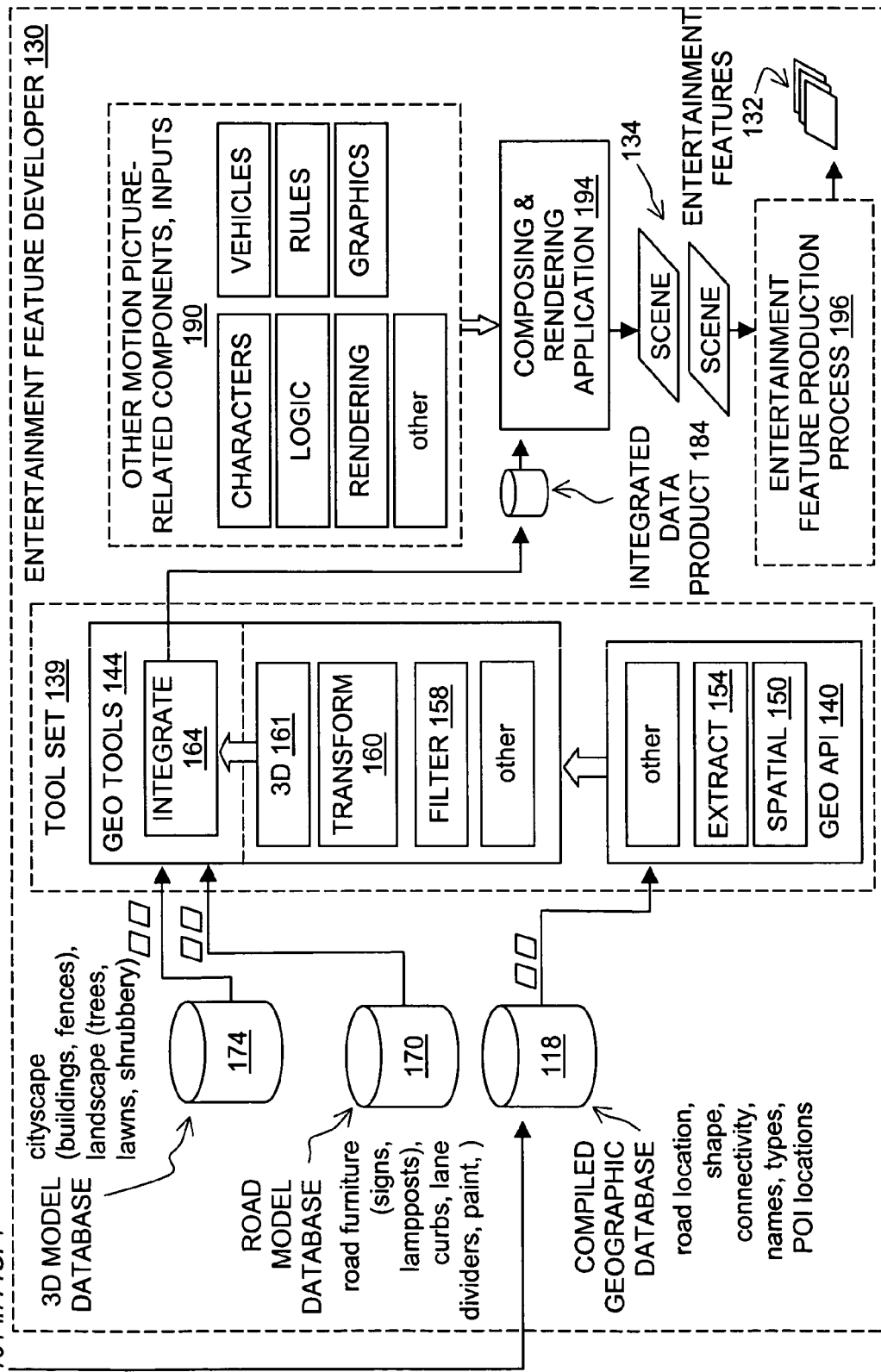
FIG. 3 is a block diagram showing components of a system used by the entertainment feature developer of FIG. 2.

Referring to FIG. 3, the entertainment feature developer 130 uses a tool set 139. In one embodiment, the tool set 139 includes a geographic data API (application programming interface) 140 and geographic data tools 144 to access and use data contained in the compiled geographic database 118. The tool set 139 includes software applications written in an appropriate computer programming language and stored on a computer-readable medium. The applications in the tool set 139 are read from the medium, loaded into a memory of a suitable computer platform, and run as needed to perform their respective functions. In one embodiment, the geographic database API 140 and data tools 144 are similar or identical to the interface layer and related navigation applications described in U.S. Pat. Nos. 5,974,419, 5,953,722, 5,968,109 and 6,047,280, the entire disclosures of which are incorporated by reference herein. In general, the geographic data API 140 provides a library of functions that facilitate accessing the data contained in the compiled geographic database 118.

The geographic data API 140 and data tools 144 provide various ways that the data in the geographic database 118 can be accessed. Some of these ways the geographic data API 140 and data tools 144 provide for accessing the geographic database 118 include the following:

1. Spatial

Referring to FIG. 3, among the functions provided by geographic data API 140 and data tools 144 is a spatial search function 150. The spatial search function 150 supports spatial queries. Spatial queries return data records of a specified type (e.g., data that represent road segments) based on location criteria included in the query. For example, a spatial query may request all the data records that represent road segments that are within 5 km of a given latitude and longitude. Another spatial query may request all the data records that represent restaurants that are within a rectangular area having specified geographic boundaries. The spatial search function 150 returns all the data records that meet these criteria.

2. Extraction (Slicing)

The geographic API 140 and data tools 144 provide an extraction function 154. The extraction function 154 supports extraction of slices of data from the geographic database 118. The entertainment feature developer 130 may want to make a scene that provides for representation of only a portion of the coverage area of the geographic database 118. As an example, the geographic database 118 may have a coverage area of Florida (i.e., includes data that represents the entire state of Florida); however, the entertainment feature developer 130 wants to create scenes showing a drive along only the streets of Miami. Using the extraction function 154, the entertainment feature developer 130 can extract from the geographic database 118 the data that represents only the city of Miami.

3. Filter

The data in the geographic database 118 may be provided with a high level of detail and/or accuracy. For example, the data in the geographic database 118 may represent the locations of roads in a geographic region with a level accuracy of ±5 meters. This high level of detail is appropriate for navigation-related functions, such as vehicle positioning. However, providing a high level of detail requires a relatively large amount of data. For some motion picture or television show scenes, a high level of detail may be unnecessary. Reducing the level of detail and/or accuracy reduces the amount of data needed to represent a geographic area. Furthermore, reducing the level of detail and/or accuracy may also facilitate processing of the data.

Accordingly, another function provided by the geographic API 140 and tools 144 is a filter function 158. The filter function 158 filters the geographic data obtained from the geographic database 118. The filter function 158 selectively eliminates portions of the geographic data obtained from the geographic database 118, while maintaining a given coverage area. According to one embodiment, the filter function 158 eliminates some of the data used to represent the shape of road segments (e.g., shape point data). The shape data are thinned out so that the entire road is still represented, but not necessarily with the same level of accuracy. For example, instead of representing a road with a level of accuracy of ±5 meters, the filter function 158 deletes shape point data so that the road is represented with a level of accuracy of ±25 meters. This reduction in accuracy results in a corresponding decrease in the amount of data needed to represent a geographic area. In another embodiment, the filter function 158 can be operated to eliminate entire classes of roads, such as all side streets.

Using the filter function 158, the entertainment feature developer can obtain data from the geographic database that suitably represents a geographic area, without having more data than is needed to represent a geographic area with the desired level of detail and/or accuracy for purposes of the scenes for the motion picture or television show.

4. 3D Conversion

The geographic API 140 and data tools 144 also include a 3D conversion function 161. The 3D conversion function 161 supports conversion of the data obtained the geographic database 118 so that it can be displayed as a 3D (perspective view) image. The 3D image may represent the geographic area in the scene from various points of view, as determined by the entertainment feature developer. The view may be an overhead view. (This 3D function may be incorporated here in the geographic API 140 and data tools 144 or may be incorporated into another application such as the composing and rendering application 194, described below.)

5. Transformation

The geographic API 140 and data tools 144 also include a transformation function 160. The transformation function 160 converts the data obtained the geographic database 118 into a different format. The different format may be one that is suitable for use by the composing and rendering application 194. For example, the data may be transformed so that it is more suitable for 3D display. As another example, the data may be transformed so that it can be rendered quickly, i.e., to simulate a vehicle moving at high speed.

6. Integration

The geographic API 140 and data tools 144 include an integration function 164. The integration function 164 provides for associating data obtained from the geographic database 118 with other, new types of data. Among the new types of data that are associated with the geographic data are road models and 3D models. The road models and 3D models are stored in a road model database 170 and a 3D model database 174, respectively.

The data in the road model database 170 are representations used for visual appearance and rendering of road-related things, such as road pavement, lane stripes, curbs, sidewalks, signs, lampposts, lane dividers, traffic signals, speed bumps, crosswalks, and so on. These road model representations are associated with data representation of the road network obtained from the geographic database 118. As stated above, the data in the geographic database 118 is (or is derived from) a representation of a road network used for navigation. As such, the data in the geographic database 118 may not indicate what roads, or things associated with a road, look like. For example, in the geographic database 118, a data representation of a road for navigation purposes may indicate the locations (e.g., geographic coordinates) of intersections, and possibly the locations of points along a road segment between intersections, the legal (and illegal) connections between roads, the names of roads, the addresses ranges along roads, the type of road surface, and so on. However, in the database 118 a data representation of a road for navigation purposes may not contain information that indicates the actual visual shapes, colors, dimensions, etc., of these road-related things. For example, in the database 118 a data representation of a road for navigation purposes may not indicate the colors of a road, curbs, sidewalks, what a sign looks like, and so on. The road model database 170 includes these types of information.

The integration function 164 provides for associating data in the road model database 170 with data from the geographic database 118 that represents the road network. The integration function 164 may associate road model data with specific locations along a road segment (as represented by data from the geographic database 118) or with lengths along a road segment. As an example, the integration function 164 may provide for showing curbs (using a model for what a curb looks like from the road model database 170) along all side streets (represented by data from the geographic database 118). In another example, the integration function 164 may provide for showing barriers along all the sides of expressways (using a model for barriers from the road model database 170) as represented by data from the geographic database 118. The integration function 164 may also provide for associating data models for traffic signals at intersections.

The road related things in the road models database may include any kind of spatial data, including random things, such as graffiti.

The data representations of road-related things in the road models database are also used for providing other properties of the represented things, such as the physical and audio properties. For example, causing a simulated vehicle to move over a simulated curb causes the simulated vehicle to "bump." Similarly, a simulated vehicle "hitting" a simulated lamppost causes a simulated crashing sound.

The road model database 170 may include a variety of different data models for some types of road-related things. For example, there may be a number of different types of traffic signal configurations. These different types of traffic signal configurations are used to provide variety and to make the representation of the road network appear more realistic, i.e., so that all the traffic signal configurations do not look the same.

The entertainment feature developer uses the integration function 164 to combine data from the road model database 170 with data from the geographic database 118 to provide a realistic appearing and acting road network. The road model database 170 is not intended to represent the actual road-related things, such as the exact locations of signs, the exact text on signs, the exact configuration of traffic signals, etc. Neither the geographic database 118 nor the road model database may contain information that represents the actual location of signs or the exact configuration of traffic signals. However, the road model database 170 provides data for visually representing these road-related things in a manner that would be typical for the geographic area. So, for a residential neighborhood, the road model database would include models for sidewalks, cross walks, stop signs, etc., which would be associated with appropriate locations along the road network as defined by the geographic database 118. The integration function 164 and the road model database 170 provide for both the density (how many signs per mile or how many lampposts per block) and the style (shape, height, sign text wording) of these road related things.

As mentioned above, the integration function 164 associates data from the 3D model database 174 with the road network represented by the geographic database 118. The 3D model data in the 3D model database 174 includes representations used for visual appearance and rendering of cityscape- and landscape-related things, such as buildings fences, trees, shrubbery, lawns, fences, clouds, scenery, and so on. Like the road models, these 3D model representations are associated with locations along the road network data as represented by data from the geographic database 118.

The cityscape and landscape related things in the 3D models database may include any kind of spatial data, including random things, such as graffiti.

The data representations of cityscape and landscape-related things in the 3D models database are also used for providing the other properties (e.g., physical and audio) of the represented things. For example, causing a simulated vehicle to strike a simulated building causes the simulated vehicle to stop and make a crashing sound. As another example, a simulated vehicle can drive over a simulated shrub, but not a simulated tree.

After the entertainment feature developer 130 has used the API 140 and geographic data tools 144 to extract, transform, filter, and integrate the data from the database 118 with the data from the road model database 170 and 3D model database 174, as appropriate, a data product 184 representing a geographic area and suitable for use in the composing and rendering application 194 is formed. The entertainment feature developer 130 uses the composing and rendering application 194 to create scenes 134. In the composing and rendering application 194, data from the data product 184 is combined with other entertainment feature-related components and inputs 190 to create scenes 134. Among the other entertainment feature-related components and inputs 190 are data and programs that provide and/or represent characters, logic, vehicles, and so on. Creation of visual scenes from these types of data is known to those of skill in the art. The scenes 134 produced by the composing and rendering application 194 are used in an entertainment feature production process 196 to make entertainment features 132, such as movies and television shows.

B. Second Embodiment

Figure 4:
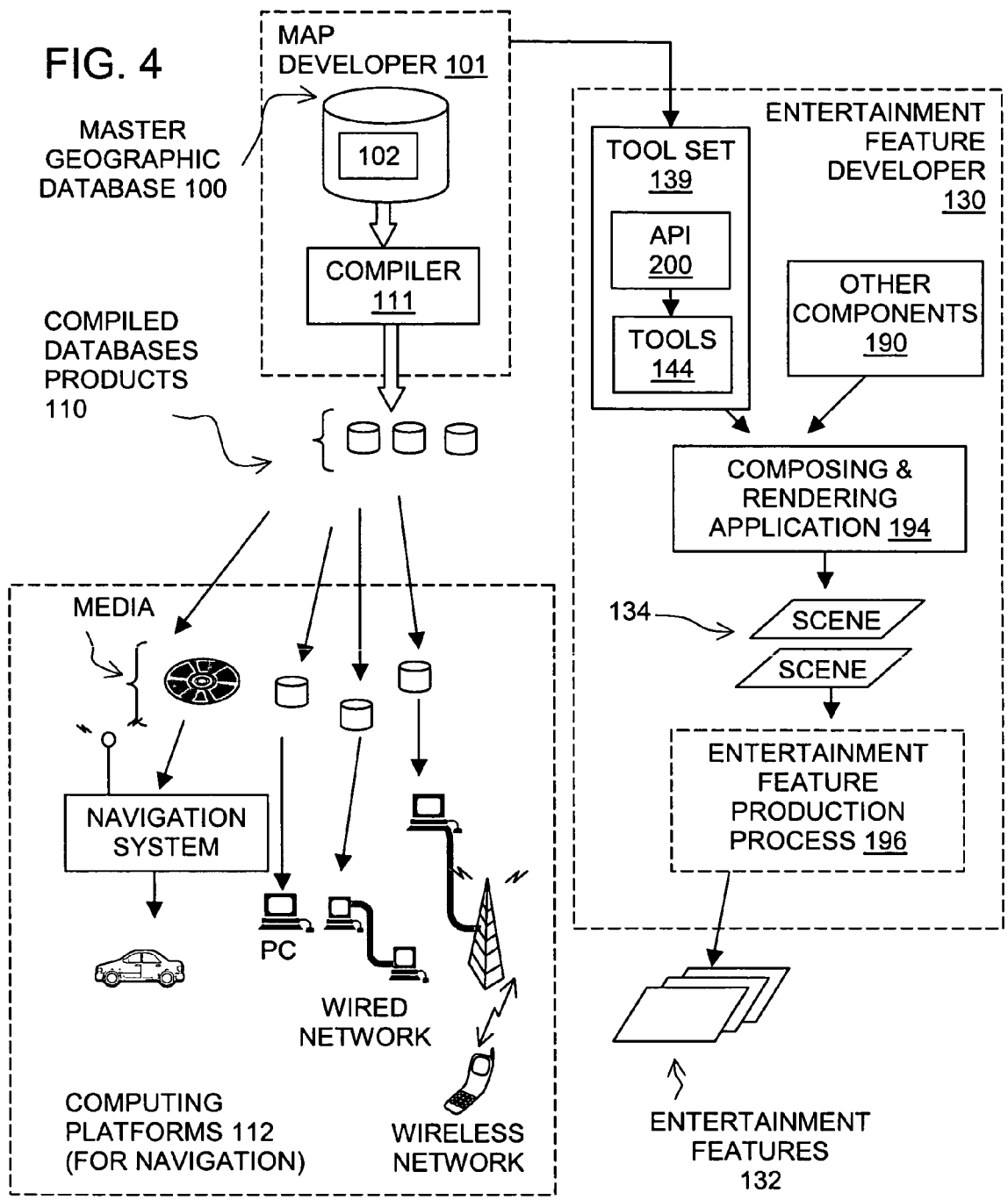
FIG. 4 is a block diagram showing another embodiment of a system for facilitating use of geographic data in developing scenes for entertainment features.

FIG. 4 shows another embodiment of a system and method for creating scenes for motion pictures or television shows, in particular, scenes that include representations of actual geographic features, such as roads, in a geographic area. In FIG. 4, like components are indicated by the same numerals as in the previous embodiment. The system and method of FIG. 4 are similar to the system and method of FIG. 2 with the exception that the motion picture and television show developer 130 receives geographic data from the master geographic database 100 instead of from one of the compiled geographic databases 118 produced from the master geographic database 100. In order to access data from the master geographic database 100, the motion picture and television show developer 130 uses an interface 200. The interface 200 is different from the API 140 (in FIG. 3) insofar as it provides for accessing geographic data in the uncompressed format in which it is stored in the master geographic database 100. This may affect the performance of the interface 200. However, this may not be a significant factor in a development environment. In other respects, the embodiment of FIG. 4 is similar to the embodiment of FIG. 3.

IV. Template Embodiments

A. First Template Embodiment

Figure 5:
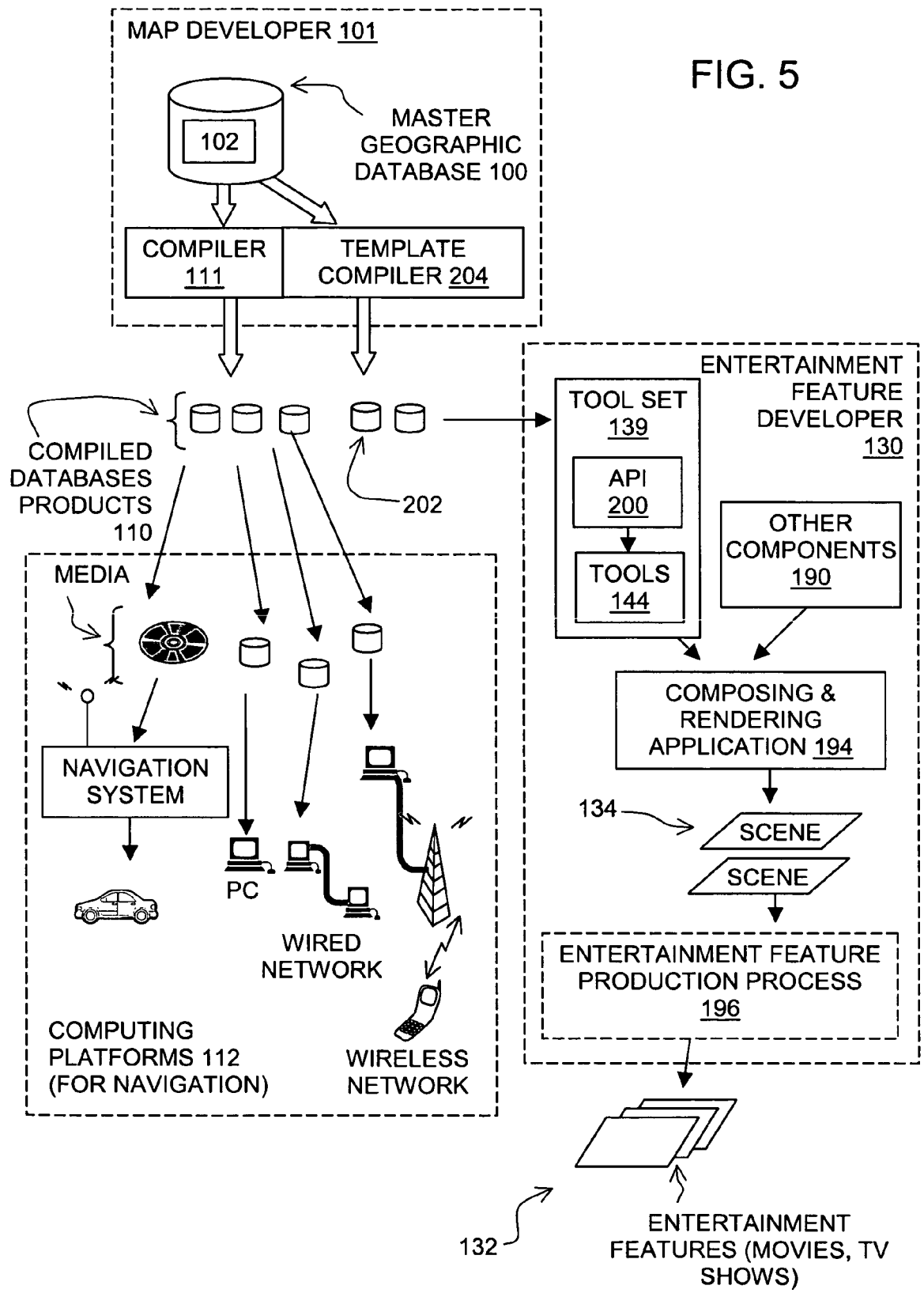
FIG. 5 is a block diagram showing an embodiment of a system for facilitating development of scenes for entertainment features using a template derived from the geographic database of FIG. 1.

FIG. 5 shows an overview of another embodiment of a system and method for creating scenes for entertainment features, such as motion pictures or television shows, using a template that includes representations of geographic features in an imaginary (not real) locale. FIG. 5 is similar to FIGS. 2 and 4 wherein like components are indicated by the same numerals as in the previous embodiments. As described previously, the master version of the geographic database 100 uses a compiler 111 to make compiled database products 110 that are used on various kinds of computing platforms.

For some motion pictures or television shows, the entertainment feature developer may want to include CG scenes that do not depict an actual geographic locale. Instead, the entertainment feature developer may want to include scenes that depict a locale which is similar to an actual geographic locale, or which is totally different from any real locales. Therefore, the geographic database developer 101 produces one or more geographic template products 202 for use by the entertainment feature developer 130. In this embodiment, the geographic template products 202 are produced by the geographic database developer 101 using a template compiler program 204, described below. The geographic template products 202 may be similar to the compiled database products 110 or the compiled database products 118 that represent actual places, except that the geographic template products 202 do not represent actual, real world places. The geographic template products 202 may be provided on a suitable media, such as one or more CD-ROM disks, DVD disks, or hard drives. Alternatively, the geographic template products 202 may be provided over a network connection.

Figure 6:
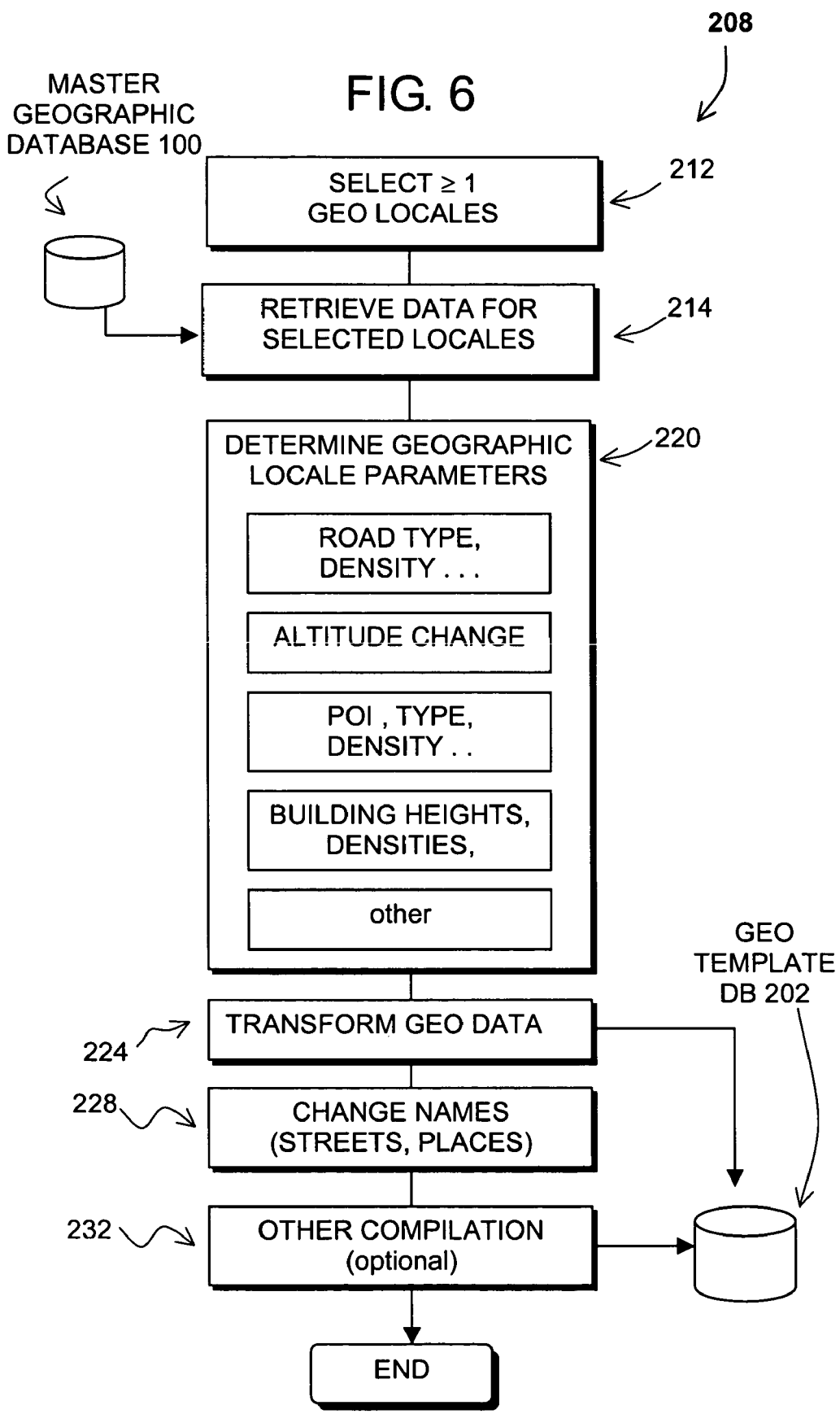
FIG. 6 is a flowchart of steps in a process performed by the template compiler of FIG. 5.

FIG. 6 shows steps in a process 208 performed by the template compiler program 204 for making a geographic template product 202 for use in producing CG scenes for motion pictures or television shows, in particular scenes that depict or represent an imaginary geographic locale. In this embodiment, the process 208 is performed by the geographic database developer 101.

The imaginary geographic locale represented by the geographic template product may be similar to one or more actual locales. For example, the imaginary locale may be a typical southern California city. The imaginary geographic locale may also be a fantasy locale. The imaginary geographic locale may also be an actual locale but set at a different historical period (past or future) than the present.

In a first step of the process 208, one or more geographic locales are selected (Step 212). In this step, the locales may include metropolitan areas, such as a southern California metropolitan area like the Los Angeles metropolitan area or the San Diego metropolitan area. Alternatively, the locales may include metropolitan areas, such as Midwestern metropolitan areas like the Chicago metropolitan area and the Detroit metropolitan area. These locales may be selected manually, e.g., by a human operator selecting the areas. Alternatively, the locales may be selected automatically using a computer program that automatically uses the data in the master geographic database 100 to select locales within a selected region that have similar geographic characteristics like road density. For example, if an operator selects a region, e.g., southern California, a program automatically identifies major urban areas in the region.

Once the geographic locales have been selected, data that represent the locales are obtained from the geographic database 100 (Step 214). In one embodiment, all the data in the master geographic database 100 that represent the selected locales are obtained. Alternatively, only some of the data in the master geographic database 100 that represent the selected locales are obtained. For example, only selected attributes that represent the locales may be obtained.

After the data that represents the selected locales has been obtained, certain parameters of the geographic locales are determined (Step 220). These parameters characterize the locales. These parameters are obtained by comparison of the corresponding data from the different locales. (If only a single locale is selected in Step 212, the parameters are determined from data that represents only the single locale.)

Examples of the types of parameters that are determined include the following:

Overall size. For example, one parameter that is determined indicates the average overall size of the locales. This parameter may be determined by calculating the average of the overall areas of the locales for which data have been obtained.

Road density (by type). Another parameter is a road density distribution. Some geographic locales have large (in area) sections with densely-spaced streets.

Road shape. Another parameter is a road shape. Some geographic locales tend to have road with lots of curves, whereas other locales tend to roads that are relatively straight.

Road widths. Another parameter indicates the different types of road widths and the percentage of each type.

Expressway density. Some geographic locales have a relatively large number of expressways.

Road orientation. Some locales tend to have roads all aligned in a north-south, east-west grid pattern.

Road alignment. Some locales tend to have a lot of roads that do not meet at right angles.

Altitude variety. Some locales tend to have many altitude changes, e.g., lots of hills.

Geographic features. These parameters indicate the types, sizes, shapes, number of geographic features, such as lakes, rivers, mountains, etc.

Open spaces. This parameter indicates the type, number, size, density, etc., of open spaces in a locale. These may include parks, golf courses, etc.

POIs. This parameter indicates the types, density, number, etc., of the points of interest in the locales. These points of interest include businesses, government buildings, monuments, stadiums, airports, etc.

Buildings. This parameter indicates the types, sizes, shapes, etc., of the buildings located in a locale.

Signage. This parameter indicates the types of signs, the text on different signs, sign shape, sign layout, the density and placement of signs, etc.

There may be other parameters that are determined in addition to these. A parameter can be determined for any type of data contained in the geographic database 100.

Once the parameters have been determined for the locales in the selected region, a template 202 is formed (Step 224). The template has a structure similar to a geographic database that represents an actual region. However, the template does not represent an actual locale. Instead, the template is based on the parameters so that its characteristics are similar to those of all the locales in the selected region. For example, if the selected region is southern California, and the selected locales include Los Angeles and San Diego, a parameter for expressway density would indicate relatively many expressways per square mile. A template formed for this region would have an expressway density that corresponds to this parameter.

One way to form the template database is to start with one of the actual databases and transform the data. For example, starting with a database that represents Los Angeles, each data entity representing a road segment (or groups of data entities representing groups of road segments) would be modified to alter the location of the represented road segment. Some techniques that may be employed to form the template database from the actual database include moving the locations of roads by varying distances, switching the relative vertical ordering of roads that cross each other at different elevations, forming mirror images of roads located in an area, performing horizontal or rotational transformations of the location of groups of roads, and so on. Quality assurance testing would be used to insure that the modification maintained database integrity, including connectivity of the modified road network.

A similar process would be used for data that represented other kinds of represented features, such as points of interest, geographic features, such as lakes, rivers, etc., buildings, and so on.

In one embodiment, sponsored points of interest (or other features) are included in the template. According to this aspect of this embodiment, a company wishing to advertise its products or services contracts with the map developer to sponsor features to be included in the template. For example, a company may advertise its products or services by having its stores or outlets included as points of interest or locations in the template. As an example, a restaurant chain may have restaurant locations in the template. (Since the template does not depict an actual geographic location, these are not actual restaurant locations.) In addition to stores or outlet locations, companies may also sponsor other types of features that are included in the template, such as signs (e.g., advertising billboards) or vehicles (e.g., trucks) with company names on their sides.

Once this information has been prepared and stored in the template geographic database, names are determined for the represented geographic features (Step 228). In determining street names, a thesaurus function may be used to obtain similar names that correspond to real world names. For example, if streets in the real world database are named "Oak" and "Pine", the template database may include corresponding streets named "Elm" and "Poplar."

After the name information is added to the template 202, other compilation steps may be performed on the template 202 (Step 232). These other compilation steps may be similar to the steps performed on the geographic database products 110 used for navigation purposes.

Referring again to FIG. 5, the template 202 is provided to the entertainment feature developer 130. The template 202 is used by the entertainment feature developer 130 in a similar manner as an actual geographic database would be used, as explained above. The entertainment feature developer 130 uses the data in the template 202, along with other data and components, to create CG scenes for a motion picture or television show 132.

In creating scenes for a motion picture or television show, the entertainment feature developer 130 may include some or all the data from the template 202. Alternatively, the scenes for a motion picture or television show may include data derived from or based on data from the template 202.

The scenes 134 created using the data from the template 202 provide for representing geographic features. However, the geographic features depicted in the scenes are not actual, real world geographic features, but are similar to the kinds of actual features that a person would find in a typical locale in a given geographic region. These depicted features include a road network, which is similar to the kind of road network a person would find in a typical locale in the given geographic region. This simulated road network in the template can be provided with the same level of accuracy and detail as a real road network.

Road model data and 3D model data, described above, may be added to the geographic template by the entertainment feature developer or by the geographic database developer. Adding road model data and 3D model data may be done in a similar manner as described above in connection with the embodiments that use geographic data that represents actual places.

As in the previously described embodiments, the scenes 134 are used in an entertainment feature production process 196 to produce entertainment features 132, such as movies or television shows.

B. Alternative Template Embodiments

In the embodiments disclosed above, it was described how template geographic databases could be developed so that the imaginary places represented by the template geographic databases resembled or possessed the style of types of actual, real world places, such as a southern Californian city. In alternative embodiments, template geographic databases can be developed that represent other types of imaginary places, such as fantasy places or historical (past or future) actual places. For example, using an embodiment disclosed herein, a template geographic database can be developed that represents New York City in the 1930's.

In the embodiments disclosed above, it was described how a template that represents an imaginary locale for use in entertainment features could be derived from data that represents actual geographic places and which is used for other functions, such as navigation. In an alternative embodiment, a template for use in entertainment features may be derived from data collected specifically for the purpose of use in motion pictures or television shows. According to this embodiment, the template could represent an actual or an imaginary locale and would be sold or licensed to entertainment feature developers for use in creating CG scenes.

V. Geographic Data Inventories Embodiment

Figure 7:
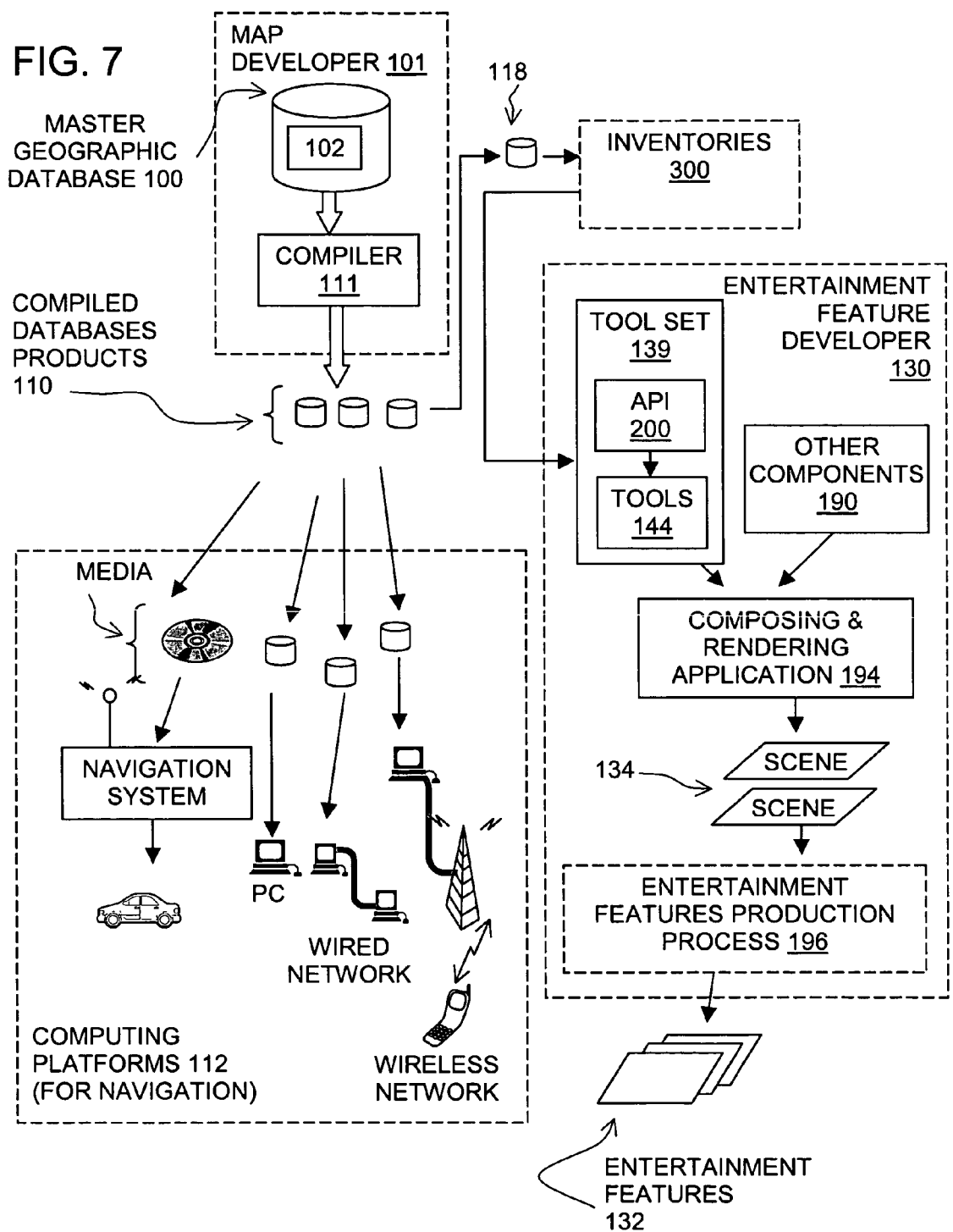
FIG. 7 is a block diagram showing another alternative embodiment of a system for using geographic data to create scenes for entertainment features.
Figure 8:
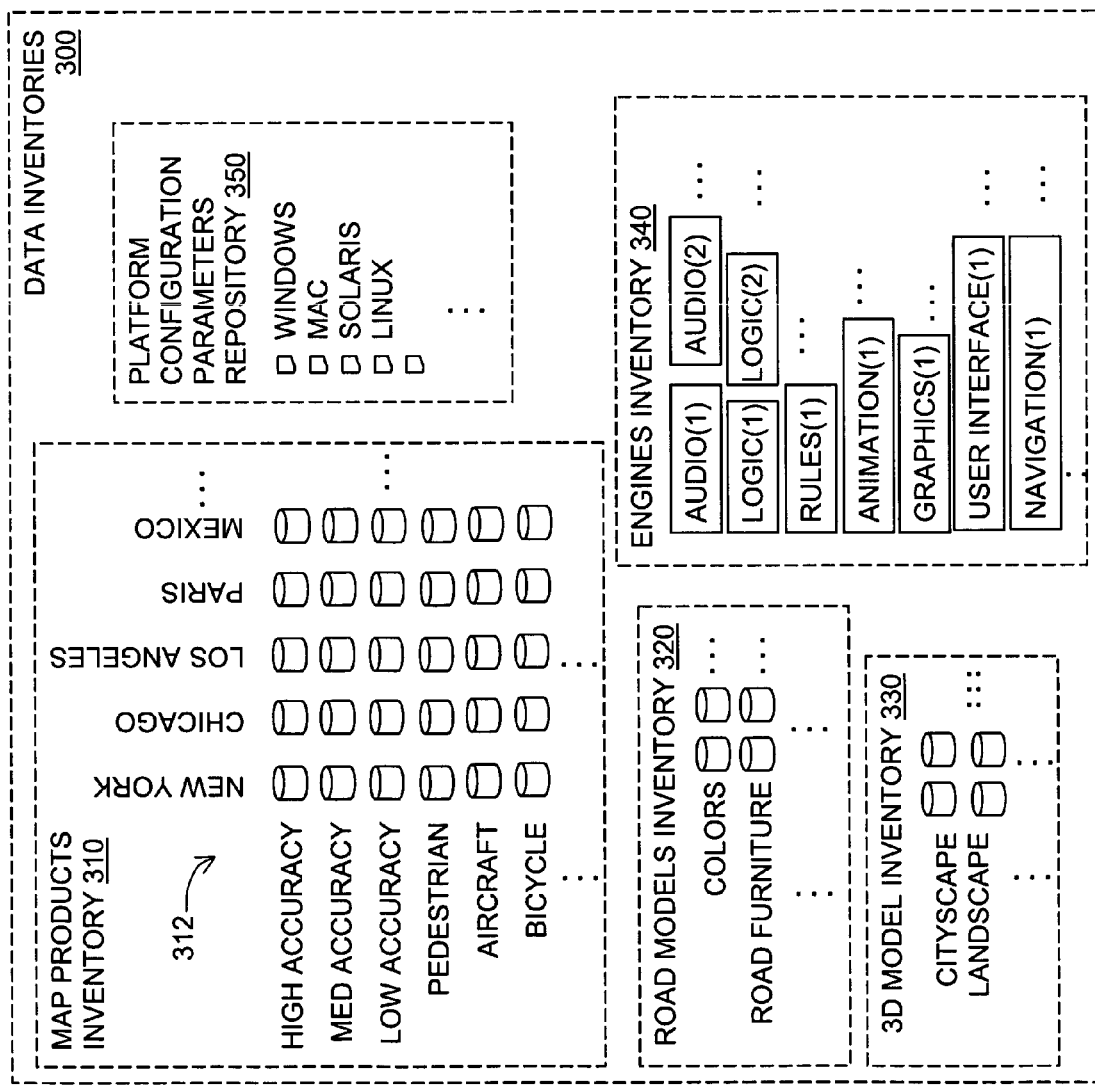
FIG. 8 is a diagram of the data inventories of FIG. 7.

FIG. 7 shows an alternative embodiment of a system and method for creating CG scenes for entertainment features using data that represent geographic features. FIG. 7 is similar to FIGS. 2, 4 and 5 wherein like components are indicated by the same numerals as in the previous embodiments. As described previously, the master version of the geographic database 100 uses a compiler 111 to make compiled database products 110 that are used on various kinds of computing platforms. The embodiment of FIG. 7 differs from the previous embodiments in that the entertainment features developer 130 uses data inventories 300 to facilitate access to and use of geographic data. Referring to FIG. 8, the data inventories 300 include a map products inventory 310, a road models inventory 320, a 3D models inventory 330, and an engines inventory 340. Each of these inventories includes a plurality of data products (i.e., databases) of the specified type. In addition, the data inventories 300 include a platform configuration parameters repository 350.

In the embodiment of FIG. 8, the map products inventory 310 includes a plurality of the different map database products 312. (The map database products 312 in the map products inventory 310 may correspond to the compiled geographic databases 118 or the templates 202 used for entertainment features, described above.) The map database products 312 include representations of geographic features in different locales. The types of geographic features that are represented include, for example, the road networks, points of interest, lakes, administrative boundaries, and other geographic features. In the embodiment of FIG. 8, the map products inventory 310 includes separate map products 312 (i.e., geographic databases) that represent the road networks and other geographic features in different geographic locales. For example, the map products inventory 310 includes geographic database products that represent the different locales of New York, Chicago, Los Angeles, and Paris. (There may be map products that represent various other locales in addition to these.) Some of the different locales represented by map data products may overlap each other. For example, there may be separate map data products for Los Angeles, Calif., and the United States.

For some of the locales, the map products inventory 310 includes separate map products that represent features in that locale differently. For example, for some of the locales there are separate database products that represent the features with high accuracy, with medium accuracy, with low accuracy, for pedestrians, for aircraft, and for bicycles. (There may be map products that represent various other types in addition to these.) The high accuracy database products include a relatively large amount of detail about the geographic features in the respective locales and also represent the geographic features relatively accurately. The medium accuracy database products include a relatively lesser amount of detail about the geographic features in the respective locale and represent the features with a relatively lower accuracy. The low accuracy database products include an even lesser amount of detail about the geographic features in the respective locale and represent the features with an even relatively lower accuracy. The pedestrian database products include geographic data pertinent to travel on foot in the respective locale. For example, the pedestrian map database products include information about sidewalks, footpaths, hiking trails, etc., but may not include information about expressways. The aircraft database products may include information about terrain, airport runways, building heights, etc., but may exclude street names, address ranges, etc. The bicycle database products may include information about bike paths, etc., but exclude airport runways. As stated above, there may be map products for many other locales and many other types of map products in the map products inventory 310.

FIG. 9 shows a process 360 for forming the different map database products 312 for entertainment features. In the present embodiment, the process 360 is performed by the map developer 101. Alternatively, the process 360 may be performed by the entertainment feature developer 130 or by another party.

In a first step of the process 360, a geographic locale is selected (Step 362). The locale may be a metropolitan area, a state, province, or country. Alternatively, the locale may be an arbitrarily defined area, e.g., an area defined by specified geographic boundaries.

After the locale is selected, a type is selected (Step 364). The type may include standard (auto), pedestrian, aircraft, bicycle, etc. Other types may be defined.

After the type is specified, an accuracy level is selected (Step 366). Levels may be specified in general terms (e.g., "high", "medium" or "low") or specific terms (e.g., 1 meter, 5 meter, 100 meter).

Once the locale, type, and accuracy levels are specified, data are retrieved from the master geographic database 100 that match the specified criteria (Step 368). For example, a spatial query is used to identify and retrieve data records that represent geographic features located in the specified locale. Similarly, other queries are used to limit the retrieved data to only those records of the specified type and accuracy.

Once the data that meet the specified criteria have been obtained from the master database 100, the data are organized into an appropriate format (Step 370). This may include compiling the data into a format in which it can be accessed and used on a given hardware platform for developing scenes for an entertainment feature. This process may include the formation of new types of data, the addition of indexes, parcelization, spatial organization and compression. Processes for forming a compiled database product are described in U.S. Pat. Nos. 5,974,419, 5,953,722, 5,968,109 and 6,047,280, the entire disclosures of which are incorporated by reference herein.

In addition to including map database products that represent actual, real world locales, the map products inventory 310 may include map products that represent imaginary locales, e.g., templates, as described above.

Referring again to FIG. 8, the inventories 300 also includes the road models inventory 320. The road models inventory 320 includes a plurality of road model databases. As described above in connection with the other embodiments, the data in the road model databases include representations used for visual appearance and rendering of road-related things, such as road colors, road pavement, lane stripes, curbs, sidewalks, signs, lampposts, lane dividers, traffic signals, speed bumps, crosswalks, and so on. Each road model database may include a variety of different data models for some types of road-related things. For example, a road models database include several different types of traffic signal configurations. These different types of traffic signal configurations are used to provide variety and to make the representation of the road network appear more realistic, i.e., so that all the traffic signal configurations do not look the same.

The road models inventory 300 includes a plurality of different road model databases. Each of these different road models databases includes models that are appropriate for a different type of locale. For example, a road models database for London will include data models for the way road signs look in London, whereas a road models database for New York will includes data models for the way road signs look in New York.

The 3D model inventory 330 includes a plurality of 3D model databases. As described above in connection with the other embodiments, the 3D model data in the 3D model databases includes representations used for visual appearance and rendering of cityscape and landscape-related things, such as buildings, fences, trees, shrubbery, lawns, fences, clouds, scenery, and so on. Like the road models, these 3D model representations are associated with locations along the road network data as represented by data from the geographic database 312. Furthermore, like the road models databases, there are a plurality of 3D models databases that include 3D models appropriate for different types of locales. For example, a 3D models database for Paris will include 3D data models for the way buildings look in Paris, whereas a 3D models database for Texas will include data models for the way buildings look in Texas.

The data representations of cityscape and landscape-related things in the 3D models database are also used for providing the other properties (e.g., physical and audio) of the represented things. For example, causing a simulated vehicle to strike a simulated building causes the simulated vehicle to stop and make a crashing sound. As another example, a simulated vehicle can drive over a simulated shrub, but not a simulated tree.

The data inventories 300 also include an engines inventory 340. The engines inventory 340 includes a plurality of different software programs (e.g., including applications or routines and/or their associated libraries). The software engines 340 perform specific, regularly performed tasks and operate on an as-needed basis (e.g., continuously) during scene rendering. An engine program may run continuously waiting to receive some input and, in response to the input, may change some output. Examples of software engines include audio engines, logic engines, rules engines, animation engines, graphics engines, navigation engines (application) and so on. The software engines inventory 340 may include several different software engines of a given type. For example, there may be several different audio engines, several different graphics engines, etc. The navigation engines include applications that make specific use of geographic data, such as a route calculation application that determines a route for part of a scene. Each of these different engines of a given type is suitable for a different kind of computer platform and/or scene.

The inventories 300 also includes the platform configuration parameters repository 350. The platform configuration parameters repository 350 includes a plurality of entries specifying configuration parameters for different computer platforms. FIG. 8 shows several general categories of computer platforms in the platform configuration parameters repository 350. (The platform configuration parameters repository 350 may include additional categories.)

Operation

The entertainment feature developer uses this embodiment to integrate selections from the inventories of map data products, road models, 3D models, and various engines (e.g. physics, visual), as well as story lines, plot details, character descriptions, etc., to create draft movies, sequence depictions, or completed titles. Configuration parameters identify which components to select from the inventories to produce movie/television scene footage. The entertainment feature developer uses this embodiment to produce CG scenes for entertainment features, as described above.

VI. Other Alternative Embodiments

In the embodiments disclosed above, it was described how geographic data could be used by an entertainment feature developer to create scenes for movies and television shows. The entertainment feature developer may be a professional or non-professional. Further, the entertainment feature may be commercial or non-commercial. As an example, a person (non-professional) may use geographic data for making scenes for a feature for personal (non-commercial) use.

The embodiments disclosed herein describe use of geographic data for making CG scenes for entertainment features, such as motion pictures and television shows. Entertainment features may also include commercials, movie trailers, training videos, school projects, documentaries, animated features, and the like.

When using any of the disclosed embodiments for making entertainment features, a relatively high visual accuracy may be required and therefore attributes that provide for relatively high visual accuracy may be needed. However, for creating some scenes, some types of attributes may not be required or fewer of some types of attributes may be required.

The embodiments disclosed herein may use geographic data obtained from multiple sources, e.g., more than one source of geographic database. In these embodiments, the data from the multiple source geographic databases may be combined by the entertainment feature developer or by another party.

As mentioned above, in some embodiments road model data or 3D model data can be combined with road data to create realistic looking scenes. In a further alternative, realistic scenes can be created using a procedural driven build model as a substitute for, or in addition to, a road model database or a 3D model database. According to this alternative, generalized rules are used to define models for a given locale. These models are then generated and associated with the data that represents a road network. As an example, a procedural model may include a rule that states that a building is 24 stories high and has a window every 14 feet or that a given geographic locale has, as a whole, 1% hills averaging 12 meters in height. A procedural model can also be used as a substitute for, or in addition to, a 3D model database. Procedural models may be more efficient in terms of storage and rendering.

Another alternative embodiment includes interactive movies. In an interactive movie, a person watching the movie can participate (e.g., provide input) that affects the storyline, scenario, scene selection, etc., of the movie. According to one version of this embodiment, a person watching the movie can choose to have scenes take place in different geographic areas. For example, instead of having a car chase in Los Angeles, the chase can take place in London. In another example, the person watching the movie can view the action in a scene from different viewpoints, e.g., overhead, street level, window level, etc. In another example, a scene can be extended, viewed in real time, viewed in slow motion, etc. In these embodiments, geographic data for different locations are included with the movie. An application programming interface (similar to the application programming interface used by the entertainment feature developer, as described above) is included with the movie. The user operates a user interface to select different locations, points of view, etc. The application programming interface included with the movie is used to access geographic data included with the movie to change locations, points of view, etc.

It is intended that the foregoing detailed description be regarded as illustrative rather than limiting and that it is understood that the following claims including all equivalents are intended to define the scope of the invention.

We claim:

1. A method of using a source database for forming derived products, wherein the source database contains data that represent geographic features in a region including roads in the region, the method comprising:

maintaining the data that represents the geographic features in the region, the data including road segment data records formatted to be compiled for a vehicle navigation system, and wherein the road segment records are associated with attributes suitable to provide navigation-related functions including vehicle route calculation and vehicle route guidance, the attributes including
 (i) geographic coordinates,
 (ii) a street name,
 (iii) an address range,
 (iv) a turn restriction, and
 (v) road shape;
using the data from the source database to form a template database;
using the template database with a tool set to develop a CG (computer graphics) scene from a street level viewpoint, wherein the scene depicts at least some of the geographic features, and wherein the template database is stored on a computer-readable storage medium; and
making an entertainment feature that includes the CG scene as a scene of the entertainment feature, the entertainment feature comprising a feature selected from the group consisting of: a television show, a motion picture, and a television commercial, wherein the entertainment feature is not a video game and is not a navigation application, wherein the entertainment feature contains characters and plot details that contribute to a story line of the entertainment feature, and wherein the CG scene is portrayed from the street level viewpoint.

2. The method of claim 1 wherein the template database includes data that provides a level of accuracy of the first set of data used for navigation-related functions.

3. The method of claim 1 wherein the template database includes data that provides a level of detail of the first set of data used for navigation-related functions.

4. The method of claim 1 wherein the step of using data from the source database to form a template database further comprises the steps of:
 selecting a real world locale;
 obtaining data that represents the real world locale, wherein the data that represents the real world locale is obtained from or derived from the source database;
 using the data that represents the real world locale to determine at least one parameter of geographic features represented thereby; and
 forming the template database using the parameter.

5. The method of claim 4 wherein the parameter includes an overall size of the locale.

6. The method of claim 4 wherein the parameter includes road densities.

7. The method of claim 4 wherein the parameter includes road shapes.

8. The method of claim 1 wherein data in the template database is combined with road model data to provide a realistic visual appearance of roads.

9. The method of claim 1 wherein data in the template database is combined with road model data to provide a realistic visual appearance of roads in the region, wherein the road model data includes data representing one or more from a group consisting of: road pavement colors, lane stripe markings, curbs, sidewalks, signs, lampposts, lane dividers, traffic signals, speed bumps, and crosswalks.

10. The method of claim 1 wherein data in the template database is combined with 3D model data to provide a realistic visual representation of polygon shaped features in the region.

11. The method of claim 1 wherein data in the template database is combined with 3D model data to provide a realistic visual representation of cityscape and landscape features in the region.

12. The method of claim 1 wherein data in the template database is combined with 3D model data to provide a realistic visual representation of one of a group consisting of: buildings, trees, shrubbery, lawns, fences, and clouds in the region.

13. A method for making an entertainment feature with a CG (computer graphics) scene, the method comprising:
 using an application programming interface program that runs on a computer platform to access a geographic database including road segment data records formatted to be compiled for a vehicle navigation system that represent roads of a geographic region, the geographic database stored on a computer-readable storage medium, wherein the road segment records are associated with attributes suitable to provide navigation-related functions including vehicle route calculation and vehicle route guidance, the attributes including
 (i) geographic coordinates,
 (ii) a street name,
 (iii) an address range,
 (iv) a turn restriction, and
 (v) road shape;
 selecting data from the geographic database that corresponds to a location within the geographic region;
 using the data in a rendering application to form the computer graphics scene depicting the location from a street level viewpoint; and
 including the computer graphics scene in the entertainment feature as a scene of the entertainment feature, wherein the entertainment feature comprises a movie excluding a computer game and excluding a map display feature, and wherein the computer graphics scene of the entertainment feature represents a story line scenario of a plot conveyed by the entertainment feature from the street level viewpoint.

14. The method of claim 13 wherein the steps are performed by an entertainment feature developer.

15. A method of using a navigation source database to derive products including a computer graphics scene of an entertainment feature, wherein the navigation source database contains data that represent geographic features in a region including roads in the region, the method comprising:
 providing a set of data from the navigation source database, wherein the set of data represents at least some of the geographic features in the region and is stored on a computer-readable storage medium, and wherein the navigation source database includes a plurality of road segment data records formatted to be compiled for a vehicle navigation system that represent the roads in the region, the road segment records associated with attributes suitable to provide navigation-related functions including vehicle route calculation and vehicle route guidance, the attributes including
 (i) geographic coordinates,
 (ii) a street name,
 (iii) an address range,
 (iv) a turn restriction, and
 (v) road shape; and
 providing a toolset with the set of data to develop a computer graphics scene of a motion picture or a television show from a street level viewpoint based on the set of data, the motion picture or the television show comprising a plurality of scenes including the computer graphics scene, the plurality of scenes depicting a sequence of the motion picture or the television show, wherein the computer graphics scene of the motion picture or the television show depicts at least some of the geographic features in the region, wherein the motion picture or the television show is distinct from a video game and distinct from a navigation application, and wherein the entire computer graphics scene of the motion picture or the television show is portrayed from the street level viewpoint containing plot details that contribute to a story line of the motion picture or the television show.

16. The method of claim 15, wherein the motion picture or television show includes a live actor.

17. The method of claim 16, wherein the computer graphics scene comprises a background, and wherein the live actor is incorporated with the background to produce the motion picture or the television show.

* * * * *